# (12) United States Patent
Pichel

(10) Patent No.: US 9,657,592 B2
(45) Date of Patent: May 23, 2017

(54) COOLING DEVICE FOR A JET ENGINE

(75) Inventor: Sacha Pichel, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 910 days.

(21) Appl. No.: 13/990,730

(22) PCT Filed: Dec. 14, 2011

(86) PCT No.: PCT/EP2011/072755
§ 371 (c)(1),
(2), (4) Date: Jul. 9, 2013

(87) PCT Pub. No.: WO2012/080332
PCT Pub. Date: Jun. 21, 2012

(65) Prior Publication Data
US 2013/0302143 A1    Nov. 14, 2013

(30) Foreign Application Priority Data

Dec. 14, 2010 (DE) .......................... 10 2010 063 071

(51) Int. Cl.
*F01D 5/08* (2006.01)
*F01D 25/12* (2006.01)
(Continued)

(52) U.S. Cl.
CPC ............. *F01D 25/12* (2013.01); *F01D 5/081* (2013.01); *F01D 5/087* (2013.01); *F02C 7/12* (2013.01);
(Continued)

(58) Field of Classification Search
CPC . F01D 5/08; F01D 5/081; F01D 5/084; F01D 5/088
(Continued)

(56) References Cited

U.S. PATENT DOCUMENTS 2,520,697 A  *  8/1950  MacLeish ........... F04D 27/0215
                                                         415/104
2,656,147 A  *  10/1953  Denison .................. F01D 5/084
                                                         416/193 A
(Continued)

FOREIGN PATENT DOCUMENTS

DE           3606597        2/1987
DE           10331834       2/2004
(Continued)

OTHER PUBLICATIONS

Jun. 27, 2013 Translation of International Search Report and Written Opinion dated Jan. 16, 2013 from counterpart PCT application.
(Continued)

*Primary Examiner* — Sean J Younger
(74) *Attorney, Agent, or Firm* — Shuttleworth & Ingersoll, PLC; Timothy Klima

(57) ABSTRACT

The present invention relates to a cooling device for a jet engine having an axial compressor with several compressor stages including a rotor with rotor blades, a stator with stator vanes and an annulus. In order to reduce the temperature of the components at the outlet of the high-pressure compressor by simple measures and hence to increase the efficiency of a jet engine, a slot-like branch opening surrounding the rotor for a cooling airflow diverted from the main airflow into a first cavity upstream of the rotor is provided upstream of the last compressor stage of the axial compressor, with passage openings being arranged in the rotor for passing on the diverted cooling airflow from the first cavity into a second cavity downstream of the rotor.

9 Claims, 5 Drawing Sheets

Figure 1:
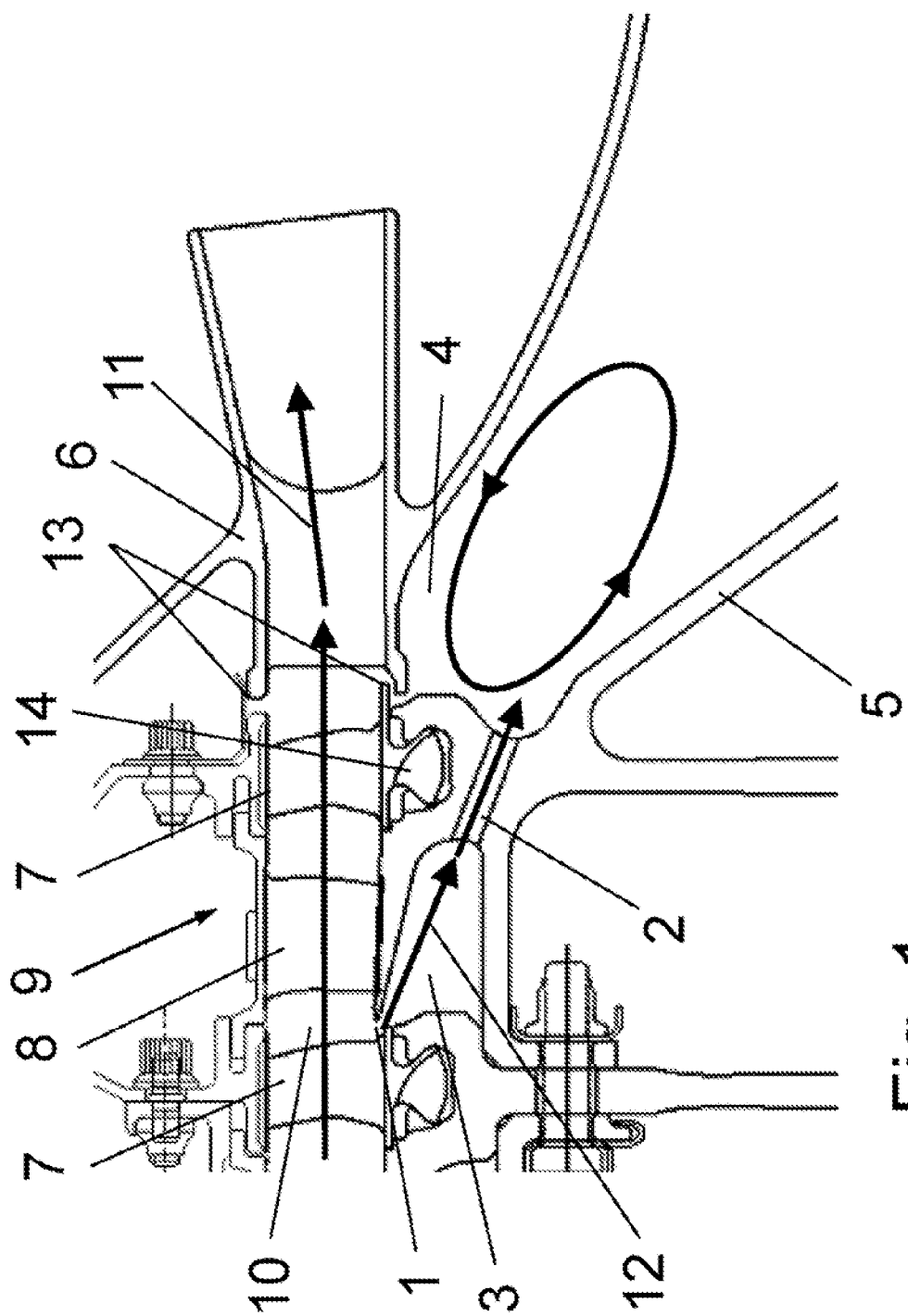

(51) Int. Cl.
*F02C 7/12* (2006.01)
*F02C 7/143* (2006.01)
*F02C 7/18* (2006.01)
*F04D 29/32* (2006.01)

(52) U.S. Cl.
CPC ............... *F02C 7/143* (2013.01); *F02C 7/18* (2013.01); *F04D 29/321* (2013.01); *F05D 2260/602* (2013.01); *Y02T 50/676* (2013.01)

(58) Field of Classification Search
USPC ........................................................ 415/144
See application file for complete search history.

(56) References Cited

U.S. PATENT DOCUMENTS

| | | | | |
|---|---|---|---|---|
| 3,712,756 A | * | 1/1973 | Kalikow | F01D 5/08 137/56 |
| 4,008,977 A | * | 2/1977 | Brown | F02C 7/18 415/1 |
| 4,127,988 A | * | 12/1978 | Becker | F01D 5/08 415/115 |
| 4,541,774 A | * | 9/1985 | Rieck | F01D 5/085 415/115 |
| 4,795,307 A | | 1/1989 | Liebl | |
| 5,685,158 A | * | 11/1997 | Lenahan | F01D 5/081 416/95 |
| 6,428,271 B1 | * | 8/2002 | Ress, Jr. | F01D 5/022 415/169.1 |
| 6,584,778 B1 | * | 7/2003 | Griffiths | F02C 7/14 60/226.1 |
| 6,647,730 B2 | | 11/2003 | Liu | |
| 6,883,314 B2 | | 4/2005 | Callas et al. | |
| 6,908,278 B2 | | 6/2005 | Brunet et al. | |
| 7,555,892 B2 | | 7/2009 | Vosberg | |
| 7,926,289 B2 | * | 4/2011 | Lee | F01D 5/081 415/145 |
| 7,934,901 B2 | | 5/2011 | Moniz et al. | |
| 8,087,871 B2 | | 1/2012 | Black | |
| 2011/0058941 A1 | | 3/2011 | Behaghel et al. | |
| 2012/0060506 A1 | * | 3/2012 | King | F01D 9/065 60/782 |

FOREIGN PATENT DOCUMENTS

| | | |
|---|---|---|
| DE | 60221558 | 4/2008 |
| DE | 60319607 | 4/2009 |
| DE | 102010016893 | 12/2010 |
| EP | 0267478 | 5/1988 |
| EP | 0735255 | 10/1996 |
| EP | 1640587 | 3/2006 |
| FR | 2914029 | 9/2008 |
| WO | 2009133308 | 11/2009 |

OTHER PUBLICATIONS

International Search Report and Written Opinion dated Jan. 16, 2013 from counterpart PCT application.
German Search Report dated Sep. 26, 2011 from front counterpart German application.

* cited by examiner

COOLING DEVICE FOR A JET ENGINE

This application is the National Phase of International Application PCT/EP2011/072755 filed Dec. 14, 2011 which designated the U.S.

This application claims priority to German Patent Application No. DE102010063071.3 filed Dec. 14, 2010, which application is incorporated by reference herein.

This invention relates to a cooling device for a jet engine having an axial compressor with several compressor stages including a rotor with rotor blades, a stator with stator vanes and an annulus.

In jet engines, the air mass flow is compressed before entering the combustion chamber. Modern jet engines with axial compressors have several compressor stages. A compressor stage of an axial compressor includes a rotor stage, in which pressure and temperature as well as the speed increase, and a stator stage, in which the pressure increases at the expense of the speed. The stator stages are firmly connected to the inside of the compressor casing.

The high compression of the air in the successive compressor stages causes a steep temperature increase. Experience has shown that in a jet engine with high pressure compressor (HPC), the temperature difference between the individual stages is about 50° C., as a result of which the compressed air exits the last compressor stage at temperatures of up to 600° C. The air so compressed and heated then flows into the combustion chamber, inside which fuel is supplied.

The temperatures of up to 600° C. downstream of the last compressor stage are detrimental to the strength of the materials. The rotor is, in particular due to heat conduction from the rotor blades, subject to a higher relative temperature than the stator and the further static components. Furthermore, the rotor is subject to a high mechanical load due to the rotation, besides higher relative temperatures.

It is already known from DE 103 31 834 A1 that the heat content of the highly compressed combustion air of a motor or of an engine can be reduced by the use of coolers and hence the efficiency can be increased.

DE 602 21 558 T2 describes an engine with turbine blade in which air is diverted from an intermediate-pressure section of the axial compressor and passed to the turbine blade in order to cool the latter.

An increase of the thermodynamic efficiency is possible with these solutions. The known solutions for cooling of the compressor air and of the engine components however have the disadvantage that the complexity and the weight of the turbine increase.

The object underlying the present invention is to reduce the temperature of the components at the outlet of the high-pressure compressor of a jet engine by simple measures and hence to increase the efficiency, i.e. the cost effectiveness and the performance, of a jet engine.

Solution to the above problematics is provided in accordance with the invention by arranging upstream of the last compressor stage of the axial compressor a slot-like branch opening surrounding the rotor for a cooling airflow diverted from the main airflow into a first cavity upstream of the rotor of the last compressor stage, where the cavity can also be an integral part of the rotor, and passage openings in the rotor for passing on the diverted cooling airflow from the first cavity into a second cavity downstream of the rotor. Hence the outlet area of the axial compressor is supplied with cooler air of a preceding stage.

Due to the difference in the rotor diameters of the last compressor stage and of the compressor stage arranged upstream of it, the branch opening is designed as a step. This step projects into the annulus and passes a part of the main airflow as a cooling airflow out of the annulus.

The passage openings are arranged concentrically to the rotor axis and may pass circumferentially/axially through the rotor. The annulus limitation between rotor and stator is designed as a gap seal to prevent return flows.

In an embodiment of the cooling device, a heat shield with sealing lips and heat shield openings is provided in the first cavity between the rotor and the stator. The cooling airflow is passed through the heat shield openings and through the passage openings on the axial blade mountings of the rotor blades into the second cavity.

The advantages of the solution in accordance with the invention are that with simple design measures, the material temperatures of the components at the end of the high-pressure compressor can be reduced and hence the use of less expensive materials is possible. When the previous materials are retained, an increase in the temperatures at the compressor outlet and hence in the efficiency is possible. A further advantage is that in comparison with already known solutions for air cooling a lower pressure loss is recorded. There is also a weight advantage when compared with already known solutions.

The device in accordance with the invention for cooling a jet engine in the area of the last compressor stage is explained in greater detail in light of the accompanying figures.

Figure 2:
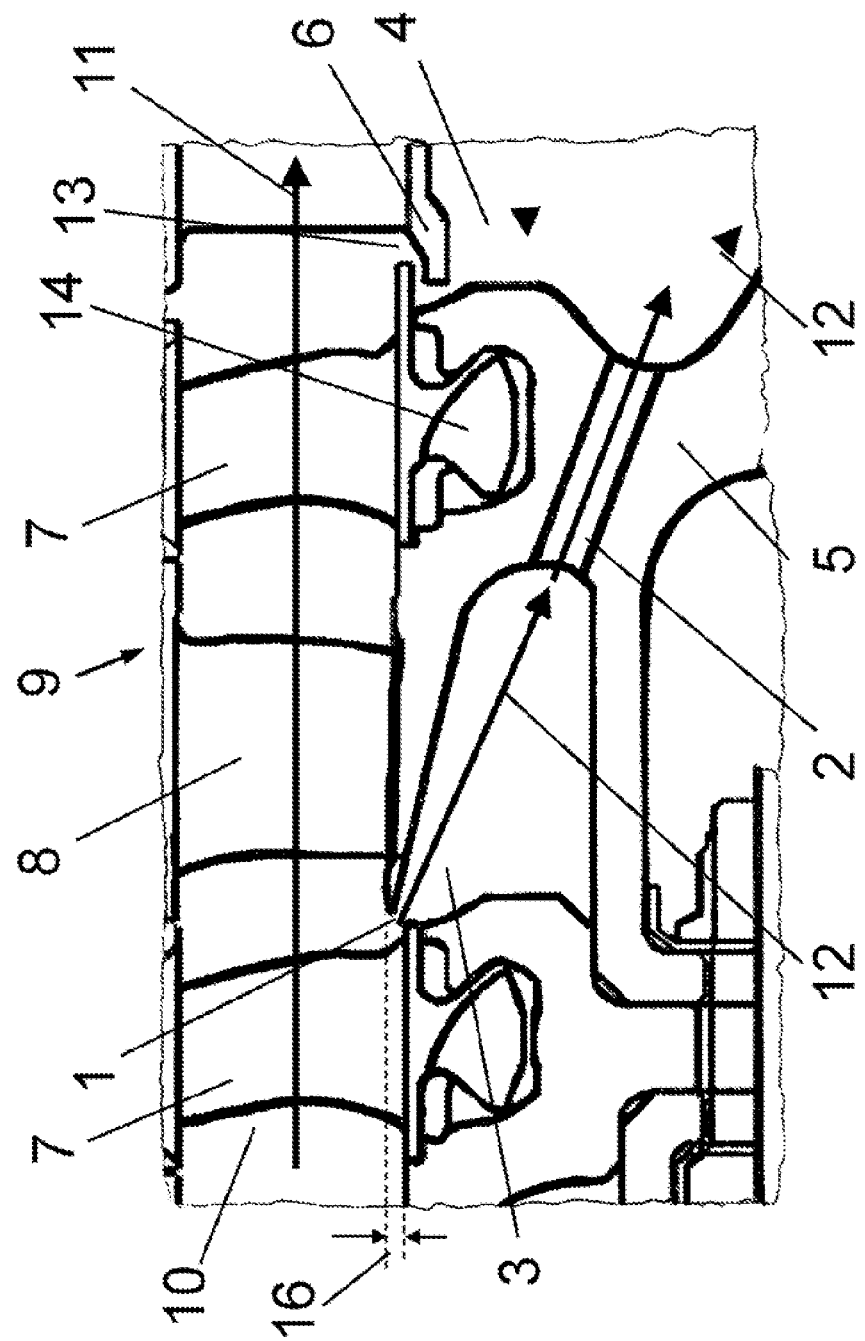
Figure 3:
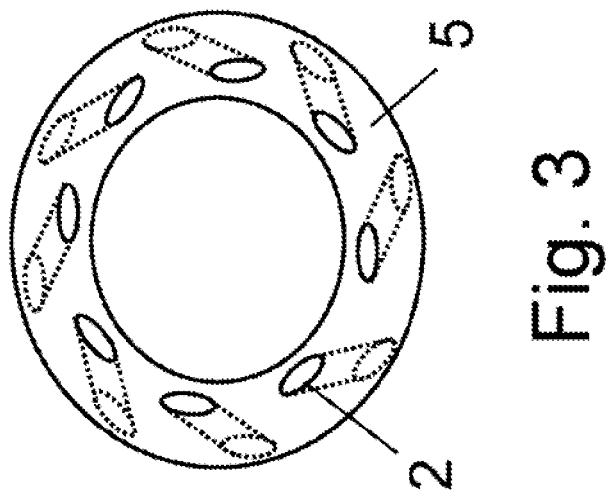
Figure 4:
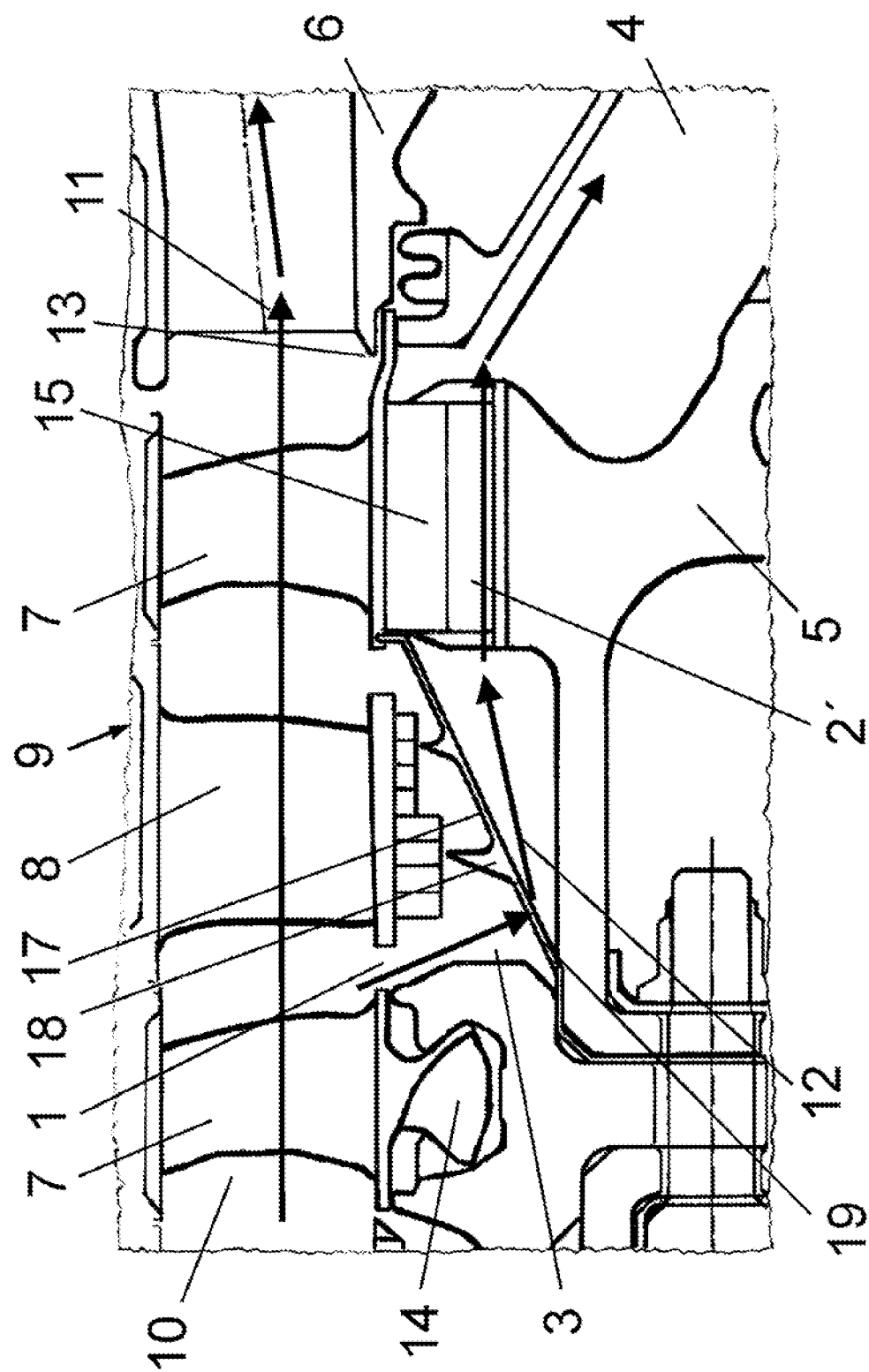
Figure 5:
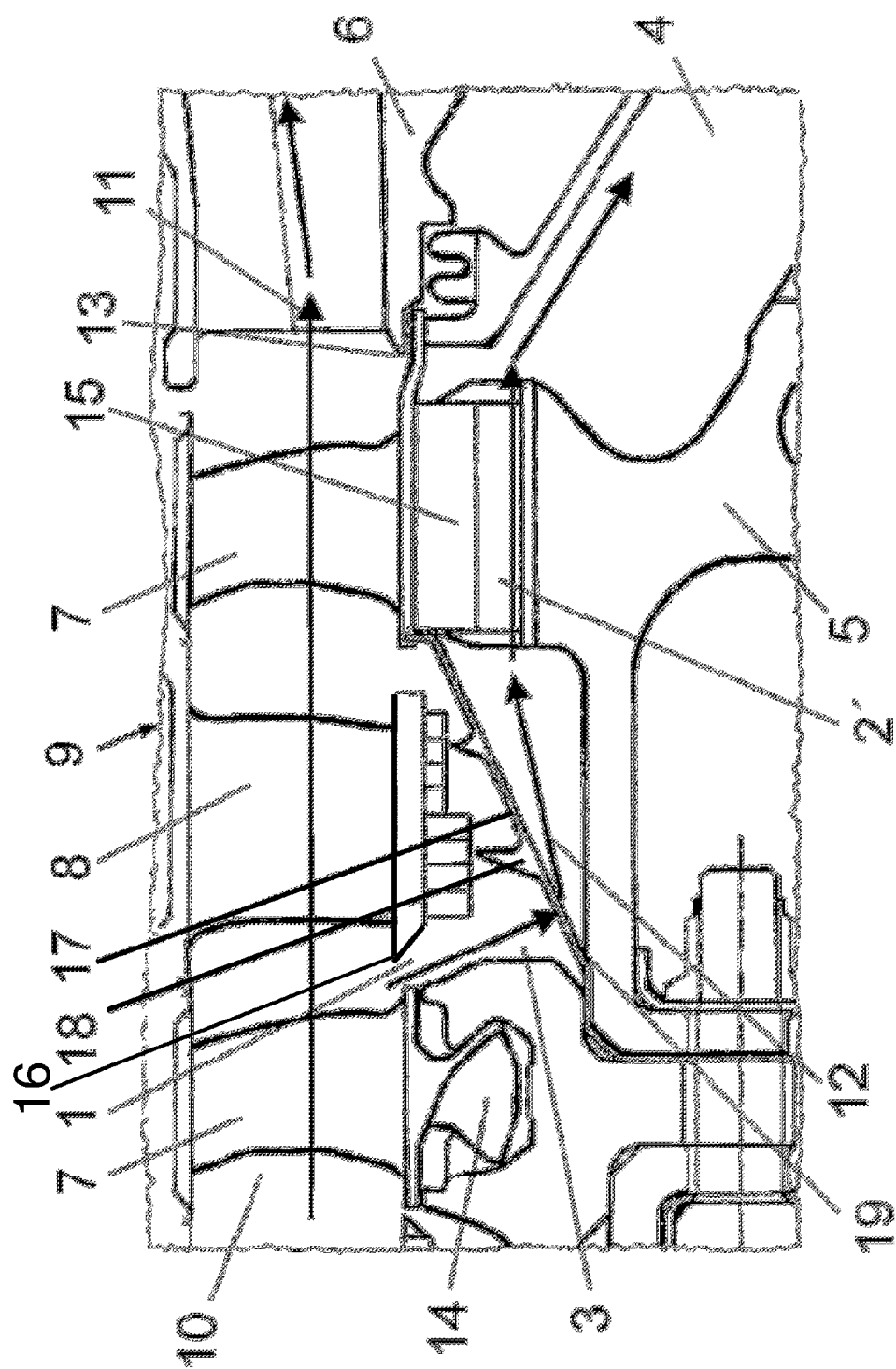

FIG. 1 shows a section of an engine in the area of the last compressor stage in partial sectional view, FIG. 2 shows an enlarged section of the engine shown in FIG. 1 in the area of the last compressor stage in partial sectional view, FIG. 3 shows a schematic sketch of an embodiment of the passage openings arranged in annular form, FIG. 4 shows a section of a further embodiment of an engine in the area of the last compressor stage in partial sectional view, and FIG. 5 shows a section of a further embodiment of an engine in the area of the last compressor stage in partial sectional view.

FIG. 1 shows a section of an axial compressor of a jet engine in partial sectional view, including a rotor 5 with rotor blades 7, a stator 6 with stator vanes 8 and an annulus 10. The rotational axis of the jet engine is below the section and is not shown. The preceding compressor stages increase the pressure of the main airflow 11 in the annulus 10. Upstream of the last compressor stage 9 of the axial compressor, a slot-like branch opening 1 surrounding the rotor 5 is provided at the annulus 10, projects in step-like form into the annulus 10 and passes a part of the main airflow 11 as a cooling airflow 12 into a first cavity 3 upstream of the rotor 5 of the last compressor stage 9. The cavity 3 can also be an integral part of the rotor 5. The diverted air mass flow of the cooling air 12 ensures, due to the kinetic energy of the air, the formation of a dynamic pressure in the first cavity 3 located underneath the stage 16. The compressed cooling air 12 is passed through passage openings 2 arranged concentrically to the rotor axis in rotor 5 into the second cavity 4 downstream of the last compressor stage 9 and there cools the rotor 5 and the stator 6. At the same time, the radial blade mountings 14 provided in the rotor 5 are cooled. A gap seal 13 prevents the around 50° C. hotter air of the main airflow 11 downstream of the last compressor stage 9 from reaching the second cavity 4.

FIG. 2 shows an enlarged section of FIG. 1. Due to the difference in the rotor diameters of the last compressor stage 9 and of the compressor stage arranged upstream of it, the branch opening 1 in the annulus 10 is designed as a step 16. The cooling air 12 flowing into the first cavity 3 passes through the axially arranged, i.e. in axis direction, passage openings 2 in the rotor 5 into the second cavity 4. The rotor blades 7 are fixed to the rotor 5 by means of the radial blade mountings 14. The stator vanes 8 are firmly connected to the stator 6. The gap seal 13 is provided between the rotor 5 and the stator 6 and prevents an inflow of hot air from the main airflow 11 into the second cavity 4 downstream of the last compressor stage 9. Due to the decentralized inflow of the cooling air 12 into the second cavity 4, the air in the second cavity 4 can circulate.

FIG. 3 shows in schematic form and in an axial view an embodiment of the passage openings 2 arranged in annular form inside the rotor 5. They are arranged concentrically to the rotor axis and pass circumferentially/axially through the rotor 5, so that the air flows in a directed manner into the second cavity 4 and hence is imparted with a pre-swirl which further improves the circulation of the cooling airflow 12. In addition, the air cools the components and the rotor 5 through which air flows.

FIG. 4 shows an alternative embodiment of the device in accordance with the invention for cooling of a jet engine in the area of the last compressor stage 9. The slot-like branch opening 1 in the annulus 10 can here also be designed as a stage (step) 16. See FIG. 5. A heat shield 17 with sealing lips 18 and heat shield openings 19 is arranged in the first cavity 3. Cooling air 12 from the first cavity 3 flows through the heat shield openings 19 in the heat shield 17 to the root of the rotor blades 7 with axial blade mountings 15 and through the passage openings 2' into the second cavity 4. The passage openings 2' are formed in this embodiment by gap openings in the area of the axial blade mountings 15.

Due to the decentralized inflow of the cooling air 12 into the second cavity 4, the air in the second cavity 4 can circulate. The gap seal 13 is designed such that an inflow of hot compressed air out of the main airflow 11 from the annulus 10 into the cavity 4 is prevented. In addition, the gap seal 13 prevents a return flow of the cooling air 12 into the annulus 10.

The embodiment shown in FIG. 4 has the advantage that the invention can be used with conventional axial blade root mountings 15.

It is furthermore advantageous that the components adjoining the second cavity 4, for example the rotor 5 and the stator 6, are flushed with cooling air 12. The cooling airflow 12 can furthermore be used for cooling further engine components.

LIST OF REFERENCE NUMERALS

1 Branch opening
2, 2' Passage openings
3 First cavity
4 Second cavity
5 Rotor
6 Stator
7 Rotor blades
8 Stator vanes
9 Last compressor stage
10 Annulus
11 Main airflow
12 Cooling airflow
13 Gap seal
14 Radial blade mountings
15 Axial blade mountings
16 Stage
17 Heat shield
18 Sealing lip
19 Heat shield openings

What is claimed is:

1. A cooling device for a jet engine comprising:
an axial compressor including:
   an annulus;
   a rotor with a plurality of rotor blade rows positioned within the annulus;
   a stator with a plurality of stator vane rows positioned within the annulus;
   the rotor blade rows and the stator vane rows together forming a plurality of compressor stages positioned within the annulus;
a slotted branch opening positioned upstream of a last one of the plurality of compressor stages, the slotted branch opening diverting a cooling airflow from a main airflow in the annulus into a first cavity upstream of a rotor blade row of the last one of the plurality of compressor stages;
at least one passage opening positioned in the rotor for passing the diverted cooling airflow from the first cavity into a second cavity positioned at least partially downstream of the rotor blade row of the last one of the plurality of compressor stages;
wherein the slotted branch opening is:
   a stepped opening projecting into the annulus and facing upstream in the annulus;
   positioned downstream of a rotor blade row positioned next upstream of the rotor blade row of the last one of the plurality of compressor stages; and
   positioned upstream of a stator vane row positioned adjacently downstream of the rotor blade row positioned next upstream of the rotor blade row of the last one of the plurality of compressor stages;
   thereby positioned in an axial direction between the rotor blade row positioned next upstream of the rotor blade row of the last one of the plurality of compressor stages and the stator vane row positioned adjacently downstream of the rotor blade row positioned next upstream of the rotor blade row of the last one of the plurality of compressor stages.

2. The cooling device in accordance with claim 1, wherein the at least one passage opening passes at least one chosen from circumferentially and axially through the rotor and is arranged concentrically to an axis of the rotor.

3. The cooling device in accordance with claim 2, and further comprising a heat shield with sealing lips and heat shield openings provided in the first cavity between the rotor and the stator, the cooling airflow being passed through the heat shield openings and through passage openings on axial blade mountings of the rotor blades into the second cavity.

4. The cooling device in accordance with claim 3, wherein an annulus limitation between the rotor and the stator is a gap seal.

5. The cooling device in accordance with claim 2, wherein an annulus limitation between the rotor and the stator is a gap seal.

6. The cooling device in accordance with claim 2, wherein the slotted branch opening opens directly to the first cavity, with the first cavity being positioned entirely upstream of the rotor blade row of the last one of the plurality of compressor stages.

7. The cooling device in accordance with claim 1, and further comprising a heat shield with sealing lips and heat shield openings provided in the first cavity between the rotor and the stator, the cooling airflow being passed through the heat shield openings and through passage openings on axial blade mountings of the rotor blades into the second cavity.

8. The cooling device in accordance with claim 1, wherein an annulus limitation between the rotor and the stator is a gap seal.

9. The cooling device in accordance with claim 1, wherein the slotted branch opening opens directly to the first cavity, with the first cavity being positioned entirely upstream of the rotor blade row of the last one of the plurality of compressor stages.

\* \* \* \* \*